(12) United States Patent
Lynch et al.

(10) Patent No.: US 7,093,195 B2
(45) Date of Patent: Aug. 15, 2006

(54) STANDARDS-BASED FORMATTING OF FLAT FILES INTO MARKUP LANGUAGE REPRESENTATIONS

(75) Inventors: Peter J. Lynch, Charlotte, NC (US); Brenda H. High, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 10/103,435

(22) Filed: Mar. 21, 2002

(65) Prior Publication Data

US 2003/0182623 A1 Sep. 25, 2003

(51) Int. Cl.
*G06F 15/00* (2006.01)
*G06F 7/00* (2006.01)

(52) U.S. Cl. .................. 715/513; 715/500; 715/505; 707/101

(58) Field of Classification Search ............... 715/513, 715/505–506, 507, 508, 522–523, 500; 707/6, 707/101
See application file for complete search history.

(56) References Cited

U.S. PATENT DOCUMENTS

| 6,067,414 | A | 5/2000 | Wang et al. ............... 395/702 |
| 6,125,391 | A | 9/2000 | Meltzer et al. ............. 709/223 |
| 6,253,366 | B1 | 6/2001 | Mutschler, III ............... 717/1 |
| 6,263,332 | B1 | 7/2001 | Nasr et al. .................. 707/5 |
| 6,279,015 | B1 | 8/2001 | Fong et al. ................. 707/523 |
| 6,289,501 | B1 | 9/2001 | Mutschler, III ............... 717/1 |
| 6,330,569 | B1 | 12/2001 | Baisley et al. .............. 707/203 |
| 6,519,598 | B1 * | 2/2003 | Nishizawa et al. ........... 707/10 |
| 6,651,217 | B1 * | 11/2003 | Kennedy et al. ............. 715/507 |
| 2001/0032218 | A1 | 10/2001 | Huang ........................ 707/513 |
| 2001/0047372 | A1 | 11/2001 | Gorelik et al. .............. 707/514 |
| 2002/0002566 | A1 | 1/2002 | Gajraj ....................... 707/513 |
| 2002/0010781 | A1 | 1/2002 | Tuatini ...................... 709/227 |
| 2002/0013788 | A1 * | 1/2002 | Pennell et al. .............. 707/507 |
| 2002/0013790 | A1 | 1/2002 | Vandersluis ................. 707/514 |
| 2003/0105642 | A1 * | 6/2003 | Andino et al. ................ 705/1 |
| 2003/0126138 | A1 * | 7/2003 | Walker et al. .............. 707/100 |
| 2004/0199869 | A1 * | 10/2004 | Lucovsky et al. .......... 715/507 |
| 2004/0205526 | A1 * | 10/2004 | Borodovski et al. ........ 715/505 |

FOREIGN PATENT DOCUMENTS

| EP | 1 037 151 | 9/2000 |
| EP | 1 122 652 | 8/2001 |
| KR | 2001067859 | 7/2001 |

OTHER PUBLICATIONS

M. Biscarrat, *XML@SAP*, SAP AG, <http://www.sap.com>, (2001).
*Ariba Buyer MQSeries Integration White Paper*, IBM Corp., <http://www-3.ibm.com/software/ts/mqseries/adapter/ws/library/ariba/whitepaper.html>, (Viewed Feb. 25, 2002).

(Continued)

*Primary Examiner*—Stephen Hong
*Assistant Examiner*—Thu V. Huynh
(74) *Attorney, Agent, or Firm*—Akerman Senterfitt

(57) ABSTRACT

A method of building an application response message can include receiving a master file specifying a message format for populating a particular data object of an application. The master document can specify element names which correspond to fields of the data object. A technique for mapping particular data items specified by at least one flat file to the element names specified in the master file can be determined; and a markup language representation of the data object can be generated according to the determined mapping technique and the specified message format.

22 Claims, 2 Drawing Sheets

OTHER PUBLICATIONS

*Interface Repository (IFR) for Collaborative Business Scenarios*, SAP, <http://ifr.sap.com/home/Documents/ifr.htm>, (Viewed Feb. 13, 2002).

C. Ruey-Shun, et al., A Web-Based Data Extraction System for Supply Chain Management Using SAP R/3, *Proc. of IEEE Int. Conf. on Systems, Man and Cybernetics*, vol. 4, pp. 2557-2562, (Oct. 7-10, 2001).

*The XML Scorecard for 3Q00*, Software Economics Letter, vol. 9, No. 8, pp. 1-3, (Aug. 2000).

T. Dubernet, et al., Base System Products-Product Data Management With Technological Variety, *ComTec*, vol. 78, No. 4, pp. 28-32, (2000).

M. Aleksy, et al., Interoperability of Java-Based Applications and SAP's Business Framework State of the Art and Desirable Developments, *Proc. of Int. Symp. On Distributed Objects and Applications*, pp. 190-200, (1999).

D. Ritter, XML: The Missing Link for B2B E-Commerce, *Intelligent Enterprise*, vol. 2, No. 7, pp. 30-2 to 36-7, (May 11, 1999).

Seeburger *Receives Official SAP XML Certification for the BIS/SAP XML Interface*, <http://www.swwburger.com>.

J. Schwartz, SAP Embraces Java and XML, *InternetWeek*, <http://www.internetweek.com/news1298/news121098-9.htm>, (Dec. 10, 1998).

Chopra, et al., XML-EDI Application Architecture, *Research Disclosure*, N. 450, Art. 92, p. 1722 (Oct. 2001).

Conversion of Final Form Data, Such as AFP, to XML, *Research Disclosure*, No. 444, Art. 208, p. 709, (Apr. 2001).

bTalk—Web-Enabling SAP, *Backsoft Corp.*, <http://www.btalk.com/content_ btalkxml.cfm>, (Viewed Feb. 13, 2002).

Method and Program to Generate Abritrary XML from a Java Hash Table . . . , *Research Disclosure*, No. 440, Art. 132, (Dec. 10, 2000).

Program Using XML to Generate Programming Tools for A Complex Program . . . , *Research Disclosure*, No. 434, Art. 153, (Jun. 10, 2000).

* cited by examiner

STANDARDS-BASED FORMATTING OF FLAT FILES INTO MARKUP LANGUAGE REPRESENTATIONS

BACKGROUND OF THE INVENTION

1. Technical Field

The invention relates to the field of data processing, and more particularly, to formatting data into markup language representations of data objects.

2. Description of the Related Art

Many issues can arise when integrating data between two or more applications. This is especially true when integrating data from different enterprise resource planning (ERP) systems and/or applications. For example, one application may utilize data objects for interacting with other applications while another application may store data in flat file form. If data is to be shared among the two applications, the data within the flat file must be converted or translated into a data object. Flat files, however, can be difficult to process due to the many possible data formats and file encodings.

One type of flat file, a comma separated value (CSV) file, consists of data organized in rows and columns with each element being separated by a comma. In a standard CSV file, all required data for an instance of an ERP data object is located in a row of a single CSV file. The column headers in the CSV file correspond to the field names in the ERP data object. For example, the structure of a CSV file typically is as follows: the first line contains the encoding of the file, the second line contains the column headers, and the third line contains the data associated with an individual occurrence of an ERP data object.

CSV files, however, do not always exist in standard format. Rather, numerous file format alternatives exist. For example, the data associated with a particular ERP data object may be contained in more than one CSV file. Other variations from the standard file format include cases in which CSV column names do not match the field names of the ERP object. Still, in other cases, CSV column data may map to multiple fields in the ERP object.

Integration service teams have developed several different techniques for dealing with the many different CSV file format variations. One technique has been to develop custom code to capture data from both standard and non-standard CSV file formats to subsequently populate ERP data objects. This technique provides streamline code which performs only those functions which are necessary to populate the ERP data objects. As a result, custom coded solutions often provide improved runtime performance. Still, limitations do exist. Specifically, developing custom code for each interface or engagement of different applications can be both time consuming and error prone. Additionally, the implementation and maintenance of custom code may require the customer to employ information technology (IT) support personnel. Finally, custom code may prove difficult to modify in the event that the ERP system is enhanced or expanded at some point in the future.

Another technique has been to capture ERP meta data within a database repository. Under this technique, rather than using custom code to generate data mappings, a graphical user interface (GUI) tool is provided for mapping the CSV file data to the appropriate fields of the ERP data object. As is known to those skilled in the art, meta data can provide a description of an interface to an application, in this case an ERP system data object. One benefit of the database technique is that all of the ERP system meta data is contained within a central repository.

The database technique does have disadvantages. In particular, to first load CSV data into a database, a mapping of each ERP system object first must be created. Additionally, the use of a database introduces another potential point of failure into a system. Another disadvantage of the database technique is that the overall runtime performance of a system decreases because of the frequent calls to the database to access the ERP system meta data.

SUMMARY OF THE INVENTION

The invention disclosed herein provides a flexible and customizable solution for loading comma separated value (CSV) data via standards based markup language messages. In particular, the present invention can facilitate the population of application and/or enterprise resource planning (ERP) system data objects with CSV data using extensible markup language (XML) messages. Through a dynamic analysis of ERP system meta data, new ERP system data objects and data extensions can be automatically supported. Any new non-standard CSV data mapping scenarios can be accommodated through a mapping file. Rather than generating a custom solution on a per customer basis, the mapping file enables the same base solution to be utilized for more than one customer, despite the degree of data customization. In consequence, customers can define additional entries in the mapping file to support a new, non-standard mapping scenario. This allows customers to extend existing data objects or define new data objects without software coding changes. The invention disclosed herein can shorten implementation cycles and is less error prone than the generation of custom code for each customer engagement.

One aspect of the present invention can include a method of building an application response message. The method can include receiving a master file specifying a message format for populating a data object of an application. For example, the master document can be an XML document that is dynamically generated according to meta data describing the data object of the application. The master document can specify element names which can correspond to fields of the data object. One or more flat files, for example CSV files, specifying data items can be read. A technique for mapping particular data items specified by the one or more flat files to element names specified in the master file can be determined.

More specifically, the mapping technique can be determined by accessing mapping data which specifies the element names and associated data items. An entry corresponding to the data object can be identified within the mapping data. For example, where the data items are associated with column headings specified by the one or more flat files, the element names of the master document can be correlated with associated ones of the column headings. If the data items are specified by several flat files, the mapping data can identify a correlation column to correlate particular data items from the several flat files to particular element names. Notably, the correlation column may or may not be mapped to one of the elements. Still, as specified by the mapping data, a correlation column other than a first column of one of the flat files can be identified for mapping data items from the several flat files to selected element names. Also, predetermined values can be assigned to selected ones of the element names according to the mapping data.

Accordingly, a markup language representation, for example an XML representation, of the data object can be generated according to the determined mapping technique and the specified message format. As a result, selected data items of the flat file can be formatted into separate instances of the data object as specified by the markup language representation.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides for the population of application and/or enterprise resource planning (ERP) system data objects with flat file formatted data. In particular, comma separated value (CSV) data can be extracted from one or more CSV files to generate a markup language message such as an extensible markup langauge (XML) message describing the ERP system data object. The markup language message provides a representation of the data object, and thus, can be used to generate the data object. The present invention can dynamically and automatically accommodate new ERP system data objects as well as ERP system data extensions. New, non-standard CSV data mapping scenarios also can be supported through a mapping file which can be modified as necessary by a customer without the need for software coding changes.

Figure 1:
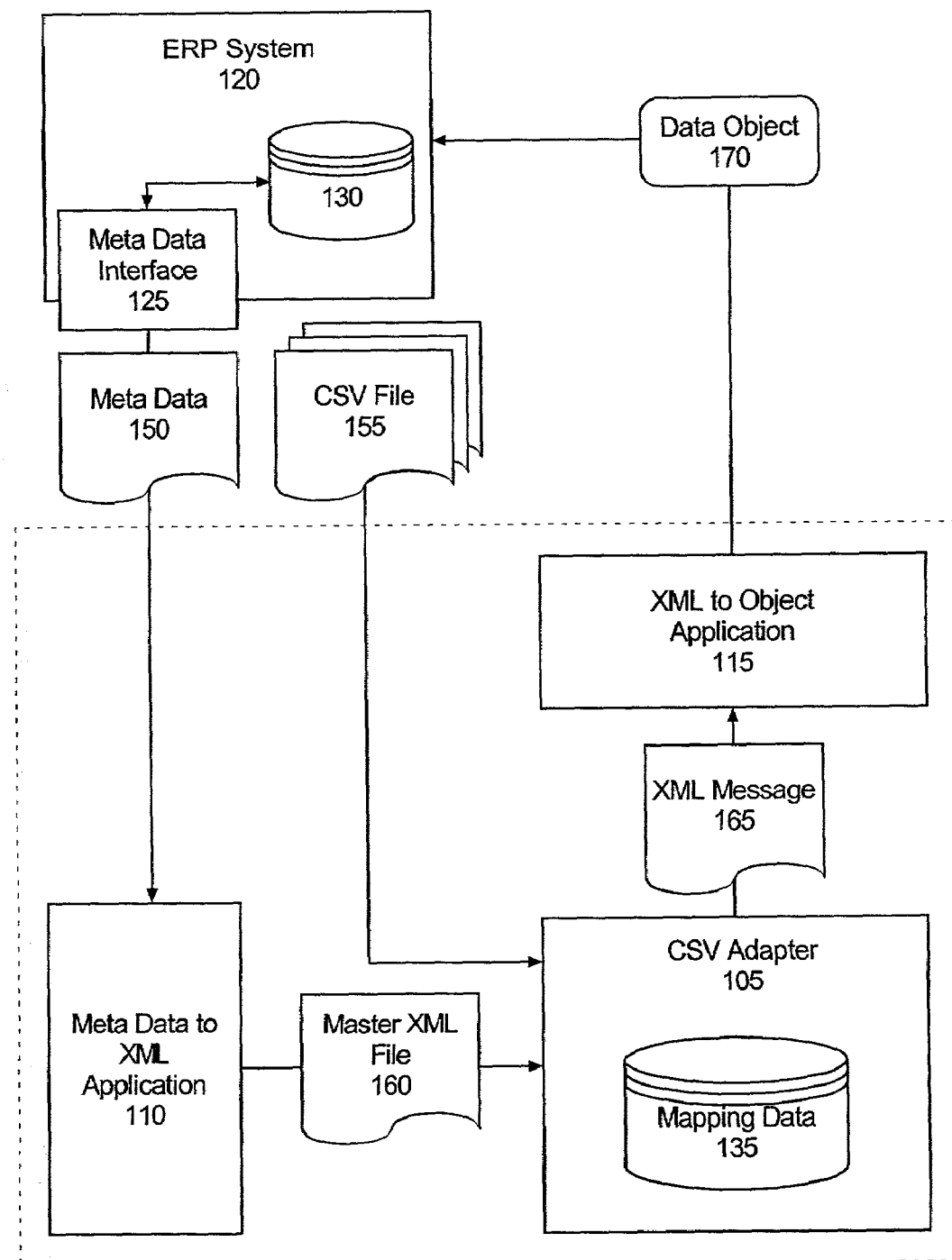
FIG. 1 is a schematic diagram illustrating a system for populating application data objects in accordance with the inventive arrangements disclosed herein.

FIG. 1 is a schematic diagram illustrating a system for populating application and/or ERP system data objects. As shown in FIG. 1, the system can include a CSV adapter 105, a meta data to XML application 110, and an XML to object application 115. An ERP system 120 also can be included. The ERP system 120 can be an application such as a multi-module software application which helps an organization manage diverse aspects of a business such as product planning, parts purchasing, maintaining inventories, interacting with suppliers, providing customer service, and tracking orders. The ERP system 120 further can manage financial and human resource aspects of a business. An example of such an ERP system can be the Ariba (TM) Buyer procurement application which is part of a comprehensive business-to-business platform available from Ariba, Inc. of Sunnyvale, Calif.

The ERP system 120 can include a defined application programming interface having a meta data interface 125 and a meta data repository 130. The meta data interface 125 provides external applications and tools with a means by which to access the meta data repository 130. The meta data repository 130 stores meta data which describes the various data objects of the ERP system 120. The data objects, for example the Java objects used to interact with the Ariba Buyer procurement application, allow applications and systems to exchange information with the ERP system 120, as well as access the various functions of the ERP system 120. Whether the data objects are pre-defined objects included within the base ERP system 120, or are provided by a user of the ERP system 120, the meta data within the meta data repository 130 can describe the various data objects of the ERP system 120. For example, the meta data can describe the data structures, methods, titles, and different subsections, including individual inputs, outputs, and data values for the various data objects of the ERP system 120.

The ERP system 120 can provide meta data 150 to one or more other applications and/or systems responsive to a meta data request (not shown). Accordingly, the meta data to XML application 110 can receive the meta data 150 from the ERP system 120 via the meta data interface 125. The meta data to XML application 110 can generate one or more master markup language files such as master XML file 160 according to the received meta data 150. Each master XML file 160 can represent the formatting and type of a specific ERP data object which is to be populated. For example, the master XML file 160 can specify information such as which ERP system data object is to be populated, for instance a purchase order data object or an address data object, as well as the fields and attributes of the data object. The master XML file 160 can include element names which correspond to data items of the CSV files, and further corresponds to fields of the data object to which the master XML file 160 is associated.

The meta data to XML application 110 can generate the master XML file 160 in accordance with meta data 150 obtained from the ERP system 120. Within an ERP system such as Ariba Buyer, meta data can be organized into objects referred to as variants. The ERP system can define a base variant for data used by the ERP system itself as well as other variants for tracking information which may be necessary for interfacing with other applications. The variants in turn can include classes which can be identified as either inbound or outbound. Inbound classes are included within an inbound electronic document definition, such as an XML document type definition (DTD), which describes objects being provided to the ERP system. Outbound classes are included within an outbound electronic document definition (XML DTD) which specifies objects being provided from the ERP system. Each class further can include one or more elements. The meta data specifying the variants, classes, and elements can be recursively processed, for example using a parser, and represented within the master XML file 160.

The CSV adapter 105 can generate a markup language message such as XML message 165. The XML message 165 can be an XML representation of an ERP system data object. The CSV adapter 105 can access the master XML file 160 to determine which data items from the CSV file 155 must be extracted as well as the format of those data items to generate the XML data object representation (XML message 165). If the data items of the CSV file 155 are not in standard format, then the CSV adapter can consult the mapping data 135, which can be specified, for example, as an XML mapping file. As mentioned, in a standard CSV file, all required data for an instance of an ERP data object is located in a row of a single CSV file. Also, the column headers of the CSV file correspond to the field names of the ERP data object. Because CSV files do not always exist in this standard format, the mapping data 135 can specify the particular ERP system data objects which do not follow this standard mapping format. Additionally, the mapping data 135 can specify how those non-standard situations are to be resolved. For example, the mapping data 135 can include entries for each ERP system data object for which following non-standard formatting applies, as well as rules for extracting data items from the CSV file or files for each of the following non-standard formatting scenarios:

CSV column names do not match the field names of the ERP object;

CSV column data maps to multiple fields in the ERP object;

A single column of data in the CSV file can span multiple lines within the CSV file;

Required data for a particular ERP object is stored within multiple CSV files and the correlation column between the files is not to be mapped, that is the correlation column is not data to be included in the resulting XML message;

Required data for an ERP object is stored in multiple CSV files and the correlation column in all fields is not the first column;

A default value is desired if no value is specified in the CSV file; and

No CSV column data is specified, for example, in cases where the ERP object field must be set to blank or remain as a "null".

The mapping data 135 can be organized into two primary sections. The first, which can be referred to as CSV reader information, can include a collection of CSV reader event elements. A CSV reader event element is used when data from multiple CSV files is combined to build a single ERP object and one of the following is true: (1) the correlation column between the CSV files is not the first column, and (2) the columns used for correlation between multiple CSV files is not to be included in the outgoing markup language message.

The second section of the mapping data 135 can be referred to as CSV event map information. The CSV event map information includes CSV event map elements which are used whenever mapping is required between the CSV file or files and the master XML file 160. The previously listed non-standard scenarios, for example, would require CSV event map elements to specify how each scenario is to be handled. For example, correlation columns can be specified as well as whether the correlation column is to be included in the resulting XML message 165. Notably, unless a CSV event map element is defined for a ERP data object, it can be assumed that the correlation column between multiple CSV files is the first column of each CSV file and that the first column is to be included in the response XML message.

The XML to object application 115 can receive the XML message 165 and produce an ERP system data object 170 from the XML representation. In particular, the XML message 165 can be processed to generate the type of data object specified by the XML message itself. For example, attribute data can be used to determine whether the data object to be added into the data table of the data object 170 being created should be a string or an object data type. Further determinations can be made as to whether the data object represents a subclass. For instance, the subclass determination can be performed by determining whether the field in the XML message has associated sub-elements. If the element in the XML message does contain sub-elements, the sub-elements can be recursively processed to form another ERP system data object.

Figure 2:
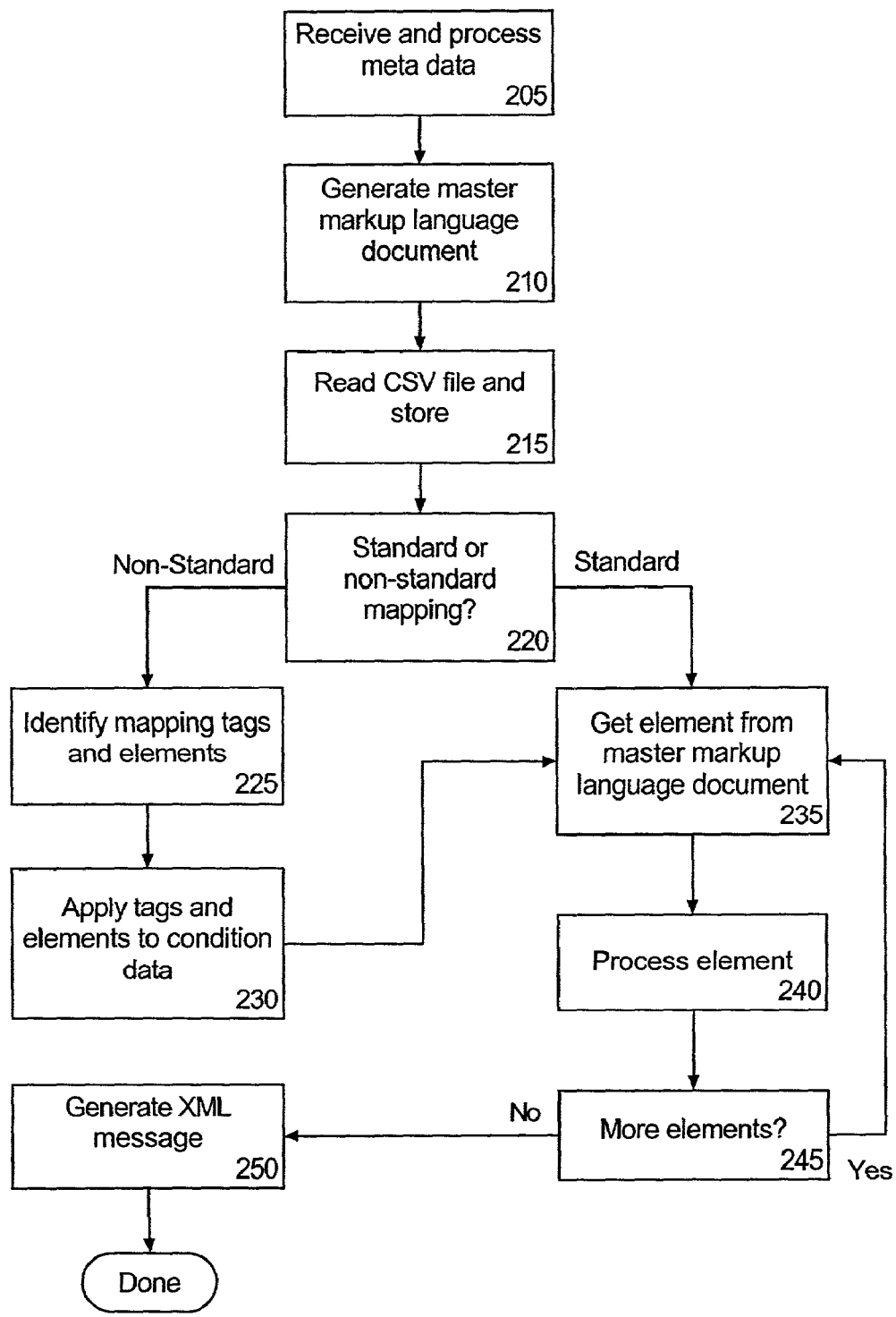
FIG. 2 is a flow chart illustrating a method of generating a markup language message for populating application data objects as performed by the system of FIG. 1.

FIG. 2 is a flow chart illustrating a method 200 of generating markup language messages for populating application data objects as performed by the system of FIG. 1. The method can begin in a state wherein meta data has been requested from an ERP system. Notably, the request can specify meta data corresponding to one or more data objects of the ERP system. In step 205, the meta data corresponding to the particular ERP system data objects as specified by the request can be received and processed. For example, the received meta data can be parsed in order to generate the master markup language or master XML document in step 210. As mentioned, the resulting master XML file can specify the particular ERP system object to be populated as well as the necessary elements to be included in the markup language representation of the ERP system object, i.e., the XML message.

In step 215, one or more flat files, for example CSV files, can be read and stored. The CSV files can be read and then stored as vectors to facilitate processing of the large amount of data items contained therein. In step 220, a determination can be made as to whether the data object to be populated can be mapped using standard mapping techniques or requires more advanced, non-standard mapping of data items from the CSV file. Specifically, the data object specified by the master XML file can be identified. The mapping data then can be searched for a reference to the data object specified by the master XML file. If no entry for the data object exists within the mapping data, then standard data mapping can be used. In that case, there can be a direct mapping between the CSV column names of the one or more CSV files and the element names of the master XML file. For instance, data items from the column heading "UniqueName" can be mapped to a "UniqueName" element specified in the corresponding master XML file. If standard mapping can be used, the method can proceed to step 235.

If, however, an entry for the data object does exist within the mapping data, this indicates that non-standard mapping must be used to map data items from the CSV file or files to particular elements of the master XML file. Notably, if an entry for the data object has been identified within the mapping data, then the mapping data should include an entry for each element specified in the master XML, and not just contain entries only for those elements that do not conform to the standard mapping technique.

Continuing with step 225, in the case where non-standard mapping must be used, the entry corresponding to the identified ERP system data object can be identified as well as the corresponding tags and elements of the mapping data. The elements can specify a correlation column between multiple CSV files, wherein the correlation column is not the first column. The elements also can specify a correlation column to be used for correlating multiple CSV files, wherein the correlation column is not to be included within the outgoing XML message. For example, the mapping data can specify which element names of the master XML file are associated with particular columns of the CSV file, despite the fact that the element names and the column names of the CSV file or files do not match. The data object entry in the mapping data further can specify an ERP data object definition composed of a variable number of tags corresponding to the fields of the data object as specified in the master XML file. For example the content of each tag can be a numeric value indicating the relative column position of a data item in the CSV file which corresponds to an associated data object field. Tags also can specify a default value in cases where a value is desired but no data is specified in the indicated column of the CSV file. The default value can include a value of null or a "null string" indicating the value of the field should be blank.

In step 230, the tags and elements of the mapping data can be applied to condition or reorder the CSV data for processing. For example, when processing multiple files, the columns to be mapped from the first CSV file can be defined by tags. In this embodiment of the present invention, columns to be mapped from subsequent files can be defined by sub-elements in the mapping file. Each of these sub-elements can specify a column attribute. This column attribute can be an integer value that is one more than the total number of columns in the first CSV file, plus the number of sub-elements already defined. In illustration, if there are 12 columns in the first CSV file and only columns 11 columns are required in the mapping occupying columns 0–10 in the outgoing XML message, the first sub-element must specify a column attribute of 12 because there must be an accounting of all of the columns, numbers 0–11, in the first CSV file even though not all of the columns are mapped. Additional sub-elements must specify the next available column number, in this case 13. Another example of conditioning the data can include replacing column headers in the CSV file or files with column headers which can be specified in the mapping data.

In step 235, a first element of the master XML document can be identified. As mentioned, the elements of the master XML file correspond to fields to be included in the XML representation of the ERP system data object. In step 240, the element can be processed. More specifically, the element can be associated with the data item that is mapped to the element. Notably, whether the CSV file was in standard format, or the data items within the CSV file have been conditioned for processing according to the mapping data, the elements are now mapped to corresponding data items, and both the standard and non-standard formatted CSV data items can be processed in the same manner.

In step 245, a determination can be made as to whether additional elements of the master XML file are to be processed. If so, the method can continue to step 235 and repeat as necessary to process the remaining elements of the master XML file. If no further elements exist, the method can continue to step 250 where the XML message can be generated. For example, each element can be written to an XML file along with the any data items associated with the elements. After step 250, the method can end.

As previously mentioned, the resulting XML message is an XML representation of an ERP system data object. Accordingly, the XML message can be provided to an XML to object application where the XML representation can be used to generate a data object which can be provided to an ERP system.

The invention disclosed herein provides for the population of application and/or enterprise resource planning (ERP) system data objects with flat file formatted data. Notably, the embodiments disclosed herein require no vendor database repository. This exclusion of such a repository can result in significant improvement in load time. Also, the invention can accommodate customization of ERP system data objects through the dynamic generation of master XML files from ERP system meta data. Customization of ERP system data objects further can be accommodated through the use of user editable mapping data which reduces, if not eliminates, the need to modify the underlaying base code.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of building an enterprise resource planning (ERP) application response message for interacting with an ERP application comprising:
   requesting meta data from said ERP application for one or more data objects of said ERP application, said meta data organized into objects defining variants that include an inbound or outbound class for tracking information provided to and from said ERP application;
   upon receiving said meta data generating at least one master file specifying a message format for populating at least one particular data object with the inbound or outbound class provided by at least one of said variants and updating said inbound or outbound class to describe whether said data object is provided to or provided from said ERP application, each master file identifying a particular data obiect to populate and specifying element names which correspond to fields of said particular data object, said meta data describing said particular data object;
   determining a technique for mapping particular data items specified by at least one flat file to said element names specified in said master file; and
   generating said application response message as a markup language representation of said particular data object according to said determined mapping technique and said specified message format.

2. The method of claim 1, said generating step further comprising:
   dynamically generating said master document according to said meta data by recursively processing said variants for identifying inbound classes and outbound classes wherein said meta data describes at least one of a data structure, method, and title corresponding to said data object.

3. The method of claim 1, further comprising:
   reading a flat file specifying said particular data items.

4. The method of claim 1, said determining step comprising:
   accessing mapping data, said mapping data specifying said element names and associated data items; and
   identifying an entry corresponding to said data object within said mapping data.

5. The method of claim 4, wherein said data items are associated with column headings specified by said at least one flat file, said determining step further comprising:
   correlating said element names of said master document with associated ones of said column headings according to said mapping data.

6. The method of claim 4, said determining step further comprising:
   correlating a data item which spans several lines of said at least one flat file to one of said element names according to said mapping data.

7. The method of claim 4, wherein said data items are specified by a plurality of flat files, said determining step further comprising:

identifying a correlation column from said mapping data;

correlating particular data items from said plurality of flat files to particular element names according to said mapping data, wherein said correlation column is not mapped to one of said elements.

8. The method of claim 4, wherein said data items are specified by a plurality of flat files, said determining step further comprising:

identifying a correlation column other than a first column of one of said flat files for mapping data items from said plurality of flat files to selected element names according to said mapping data.

9. The method of claim 4, said determining step further comprising:

assigning a predetermined value to selected ones of said element names according to said mapping data.

10. The method of claim 1, further comprising:

formatting selected data items of said flat file into separate instances of said data object as specified by said markup language representation.

11. The method of claim 1, wherein said master file and said markup language representation of said data object are extensible markup language files and said at least one flat file is a comma separated value file.

12. A computer-readable program product, having stored thereon a computer program having a plurality of code sections executable by a machine for causing the machine to perform the steps of:

requesting meta data from said ERP application for one or more data objects of said ERP application, said meta data organized into objects defining variants for tracking information provided to and from said ERP application, wherein said variants include inbound or outbound class;

upon receiving said meta data, generating at least one master file specifying a message format for populating at least one particular data object with the inbound or outbound class provided by at least one of said variants and updating said inbound or outbound class to describe whether said data object is provided to or provided from said ERP application, each master file identifying a particular data object to populate and specifying element names which correspond to fields of said particular data object, said meta data describing said particular data object;

determining a technique for mapping particular data items specified by at least one flat file to said element names specified in said master file; and generating an application response message as a markup language representation of said particular data object according to said determined mapping technique and said specified message format.

13. The computer-readable program product of claim 12, said generating step further comprising:

dynamically generating said master document according to said meta data by recursively processing said variants for identifying inbound classes and outbound classes wherein said meta data describes at least one of a data structure, method, and title corresponding to said data object.

14. The computer-readable program product of claim 12, further comprising:

reading a flat file specifying said particular data items.

15. The computer-readable program product of claim 12, said determining step comprising:

accessing mapping data, said mapping data specifying said element names and associated data items; and identifying an entry corresponding to said data object within said mapping data.

16. The computer-readable program product of claim 15, wherein said data items are associated with column headings specified by said at least one flat file, said determining step further comprising:

correlating said element names of said master document with associated ones of said column headings according to said mapping data.

17. The computer-readable program product of claim 15, said determining step further comprising:

correlating a data item which spans several lines of said at least one flat file to one of said element names according to said mapping data.

18. The computer-readable program product of claim 15, wherein said data items are specified by a plurality of flat files, said determining step further comprising:

identifying a correlation column from said mapping data;

correlating particular data items from said plurality of flat files to particular element names according to said mapping data, wherein said correlation column is not mapped to one of said elements.

19. The computer-readable program product of claim 15, wherein said data items are specified by a plurality of flat files, said determining step further comprising:

identifying a correlation column other than a first column of one of said flat files for mapping data items from said plurality of flat files to selected element names according to said mapping data.

20. The computer-readable program product of claim 15, said determining step further comprising:

assigning a predetermined value to selected ones of said element names according to said mapping data.

21. The computer-readable program product of claim 12, further comprising:

formatting selected data items of said flat file into separate instances of said data object as specified by said markup language representation.

22. The computer-readable program product of claim 12, wherein said master file and said markup language representation of said data object are extensible markup language files and said at least one flat file is a comma separated value file.

\* \* \* \* \*